United States Patent [19]

Kenton et al.

[11] Patent Number: 5,479,612
[45] Date of Patent: Dec. 26, 1995

[54] AUTOMATED SYSTEM AND METHOD TO DISCOURAGE ACCESS OF UNLICENSED PERIPHERAL DEVICES BY A COMPUTER SYSTEM

[75] Inventors: Kenneth Kenton, Wilmington, Del.; Jeffery A. Stell, Exton; Richard A. Coffman, Jr., Phoenixville, both of Pa.

[73] Assignee: Unisys Corporation, Blue Bell, Pa.

[21] Appl. No.: 226,922

[22] Filed: Apr. 13, 1994

[51] Int. Cl.[6] ................................................... G06F 11/00
[52] U.S. Cl. ................................................................ 395/186
[58] Field of Search ................................. 395/575; 380/4

[56] References Cited

U.S. PATENT DOCUMENTS

| | | | |
|---|---|---|---|
| 4,791,565 | 12/1988 | Dunham et al. | 364/200 |
| 4,924,378 | 5/1990 | Hershey et al. | 364/200 |
| 4,937,863 | 6/1990 | Robert et al. | 380/4 |
| 4,941,175 | 7/1990 | Enescu et al. | 380/4 |
| 5,138,712 | 8/1992 | Corbin | 395/700 |
| 5,182,770 | 1/1993 | Medveczky et al. | 380/4 |
| 5,204,897 | 4/1993 | Wyman | 380/4 |
| 5,260,999 | 11/1993 | Wyman | 384/4 |

Primary Examiner—Robert W. Beausoliel, Jr.
Assistant Examiner—Joseph E. Palys
Attorney, Agent, or Firm—Robert R. Axenfeld; Mark T. Starr

[57] ABSTRACT

System and method of encouraging computer system customers to purchase licenses before employing certain types of peripheral devices for use with their computer system. The computer system establishes contact with a peripheral device. It then verifies that the peripheral device is supported by the operating system. If the peripheral device is supported, the system determines whether the peripheral device is licensed (and therefore requires a driver license key in order for the peripheral device to be accessed by the system). If the peripheral device requires a driver license, the system determines whether the corresponding driver license key is installed in the keys file of the computer system. If the driver license key is not installed, the system compels (or encourages) installation of the driver license key by (1) displaying a licensing violation message instructing the customer to obtain the proper license; and/or (2) precluding access of the peripheral device by the computer system.

6 Claims, 4 Drawing Sheets

KEY FILE 108

| RECORD | SOFTWAREDRIVR1-SL1-1234567890-000015:ABCDEFGHIJ | 10/15/94 |
| | SOFTWAREDRIVR1-SL1-0121136710-000010:ABCDEFGHIJ | 11/10/94 |
| | SOFTWAREDRIVR1-SL1-9999998765-000900:ABCDEFGHIJ | 02/20/94 |
| | SOFTWAREDRIVR2-SL2-3333444455-000005:QRSTUVWXYZAB | 10/15/94 |
| | SOFTWAREDRIVR2-SL2-0000111222-000100:QRSTUVWXYZAB | 10/15/94 |
| | SOFTWAREDRIVR3-MSL-0120123333-000010:CFCFGG11112345 | 12/15/94 |
| | SOFTWAREDRIVR3-MSL-1111111112-001000:CFCFGG11112345 | 01/10/95 |
| | SOFTWAREDRIVR3-MSL-2323111555-000002:CFCFGG11112345 | 01/10/95 |
| | ... ... ... ... ... |

LICENSE ID 306 | UNIQUENESS 308 | QUANTITY 310 | SECURITY ID 312 | EXPIRATION DATE (OPTIONAL) 314

FIG. 4

AUTOMATED SYSTEM AND METHOD TO DISCOURAGE ACCESS OF UNLICENSED PERIPHERAL DEVICES BY A COMPUTER SYSTEM

BACKGROUND OF THE INVENTION

1. Field of the Invention

The present invention relates generally to peripheral devices connected to a computer system. More specifically, the present invention relates to an automated system and method of encouraging computer system customers to purchase licenses before employing certain types of peripheral devices for use with their computer system.

2. Related Art

Generally, there are two methods that can be used by a computer system to provide software connectivity and support for a peripheral device: (1) an external peripheral software driver (a.k.a. external software device driver); and (2) an internal peripheral software driver (a.k.a. internal software device driver) that is contained within the operating system. Computer companies that employ the first technique are able to recoup the development costs (which include design, coding, testing, documenting, and support) for the software driver by selling the driver as a separate entity. However, companies that utilize the second technique have a difficult task of recouping development costs, since the software driver is embedded within the operating system and cannot be removed easily, if at all.

The computer industry is currently attempting to find a solution to the problem facing companies that employ the second technique. One possible solution is to produce a different version of the operating system for each possible combination of software drivers embedded in that operating system and charge accordingly. However, this is impractical, since the number of supported peripheral devices can be large and varied; potentially causing exponential growth in the number of supported versions of the operating system.

A second potential solution is to include all supported software drivers in the operating system and then add a flat fee to the price of the operating system. However, this solution penalizes many customers (possibly severely) who access a small percentage of the range of available peripheral devices because they are, in effect, subsidizing those customers who access a large percentage of the available peripheral devices.

A third potential solution also involves including all supported software drivers in the operating system. It differs from the previous solution by adding a certain percentage of the software driver development cost to the price of each associated peripheral device. This allows the company to recoup its investment in software drivers over an extended period of time as peripheral devices are sold. However, this solution is viable only if customers purchase most of their peripheral devices from the company that developed the corresponding drivers. This is unlikely since the very nature of this solution encourages third party peripheral device vendors to reverse-engineer the company's peripheral devices and then offer their own versions of the devices to the company's customers at a price lower than the company can afford to offer. This lower price is directly attributable to the fact that the third party vendors do not need to invest in the development of the associated software drivers since they can utilize the drivers already embedded in the company's operating system.

Significant development resources are spent by companies developing embedded software drivers. Thus, what is needed is an effective technique which allows companies to recoup the development costs associated with their embedded software drivers.

SUMMARY OF THE INVENTION

The present invention is directed to a system and method for licensing selected embedded peripheral software drivers. These licenses represent the intellectual property associated with the development of the software drivers required for use with the corresponding peripheral devices. By charging separately for the license, the company is able to sell the peripheral devices at a price that is more in line with the competition. It also allows the company to recoup its software driver development costs by charging customers according to their use of the company's software drivers, independent of whether the peripheral devices utilized with those drivers are obtained from a third party vendor or from the company itself.

In one embodiment of the present invention, the system operates as follows: The computer system establishes contact with the peripheral device. It then verifies that the peripheral device is supported by the operating system. If the peripheral device is supported, the system determines whether the peripheral device is licensed (and therefore requires a software driver license key in order for it to be accessed by the system). If the peripheral device requires a software driver license, the system determines whether the corresponding driver license key is installed in the keys file of the computer system. If the driver license key is not installed, the system compels (encourages) installation of the driver license key by (1) displaying a licensing violation message instructing the customer to obtain the proper license; and/or (2) precluding access of the peripheral device by the computer system. Accordingly, the present invention improves the ability of computer system developers to recoup their research and development costs associated with developing embedded software drivers and therefore avoids the problems described above.

Further features and advantages of the present invention, as well as the structure and operation of various embodiments of the present invention, are described below with reference to the accompanying drawings.

BRIEF DESCRIPTION OF THE FIGURES

FIG. 4 is an illustration depicting several examples of possible software driver license keys according to a preferred embodiment of the present invention.

DETAILED DESCRIPTION OF THE PREFERRED EMBODIMENTS

The present invention relates to an automated system and method of encouraging computer system customers to purchase licenses before employing certain types of peripheral devices for use with their computer system. The detailed description of the present invention is described with reference to two main sections. The first section is directed to an embodiment of a computer system that employs the automated system and method. The second section describes the operation of the present invention.

A. Computer System 100

Figure 1:
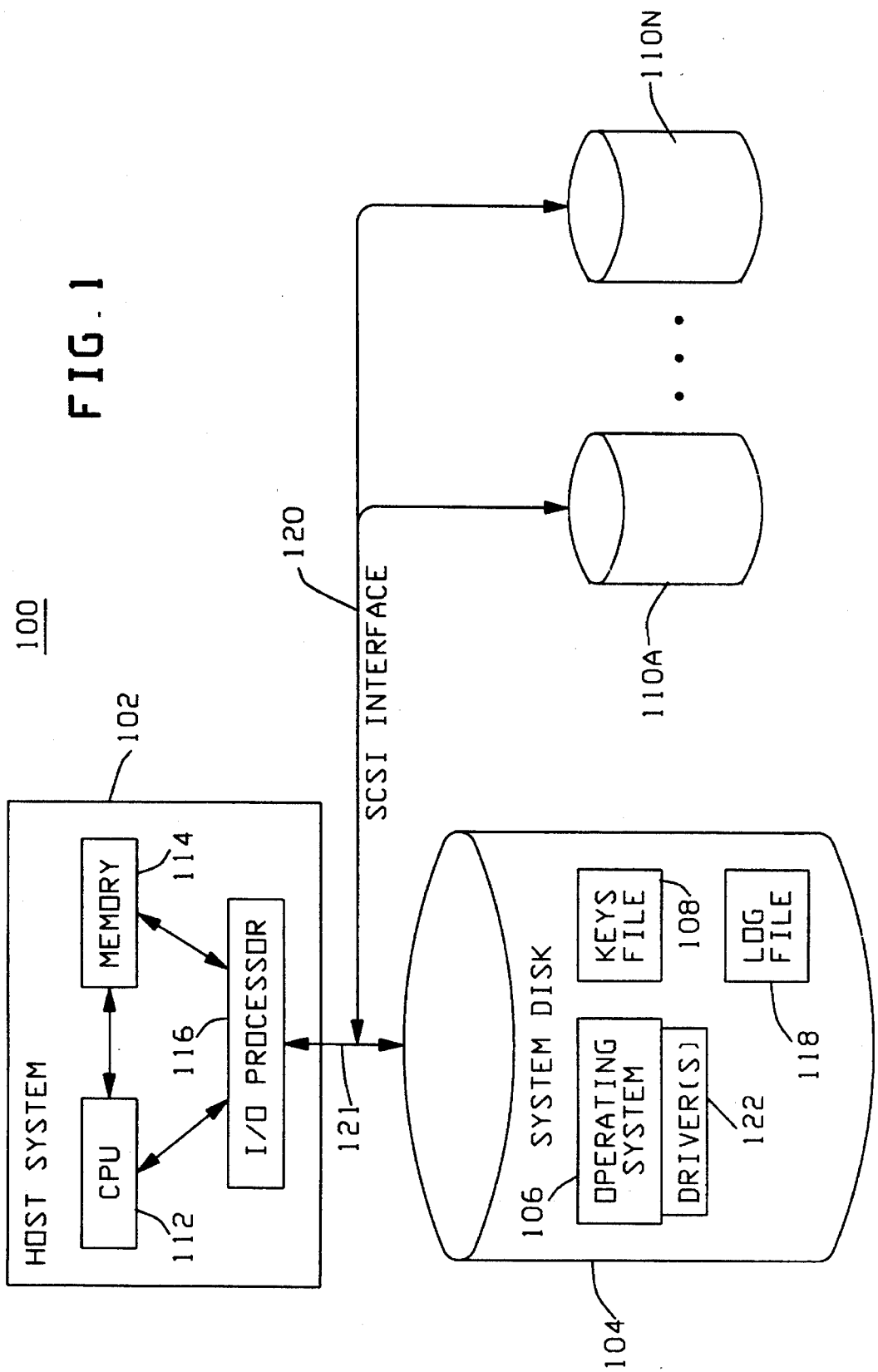
FIG. 1 is block diagram of a computer system according to a preferred embodiment of the present invention.

FIG. 1 is block diagram of a computer system 100 according to a preferred embodiment of the present invention. Computer system 100 includes three main units: a host system 102, a system disk 104 and peripheral devices 110A to 110N: (where A–N represents a range of peripheral devices 110 of an arbitrary number). In the preferred embodiment, the computer system is an A Series system developed by Unisys Corporation of Blue Bell, Pennsylvania, U.S.A., but may be any system capable of interfacing with peripheral devices 110.

The host system 102 includes a central processing unit (CPU) 112, memory 114 and an input/output processor (IOP) 116, which are all apparent to those skilled in the art. All communication between the host system 102, the system disk 104 and other devices occurs via the I/O processor 116.

The system disk 104 is connected to the host system 102 via bus 121. The system disk 104 includes an operating system 106, a keys file 108 (to be described in more detail below) and a log file 118 (to be described in more detail below). Note that the log file 118 may optionally be located on a disk device other than the system disk 104. The operating system 106 includes an internal software driver(s) 122 which permits the host system 102 to: (1) identify external peripheral devices 110; (2) issue commands to peripheral devices 110; (3) process exceptions returned by those peripheral devices 110; and (4) command the transfer of data to and from the peripheral devices 110.

The peripheral devices 110 are connected to the host system via bus 120/121. In the preferred embodiment, peripheral devices 110 employ Small Computer System Interface (SCSI) as a protocol for communication with the host system 102. Other interface protocols such as Intelligent Peripheral Interface (IPI) and Message Level Interface (MLI) can also be employed by the peripheral devices 110. It should be noted that in the preferred embodiment, peripheral devices 110 are either disk devices in the mega-to-giga byte range or tape devices, but may also be other devices such as CD-ROM devices.

Figure 3:
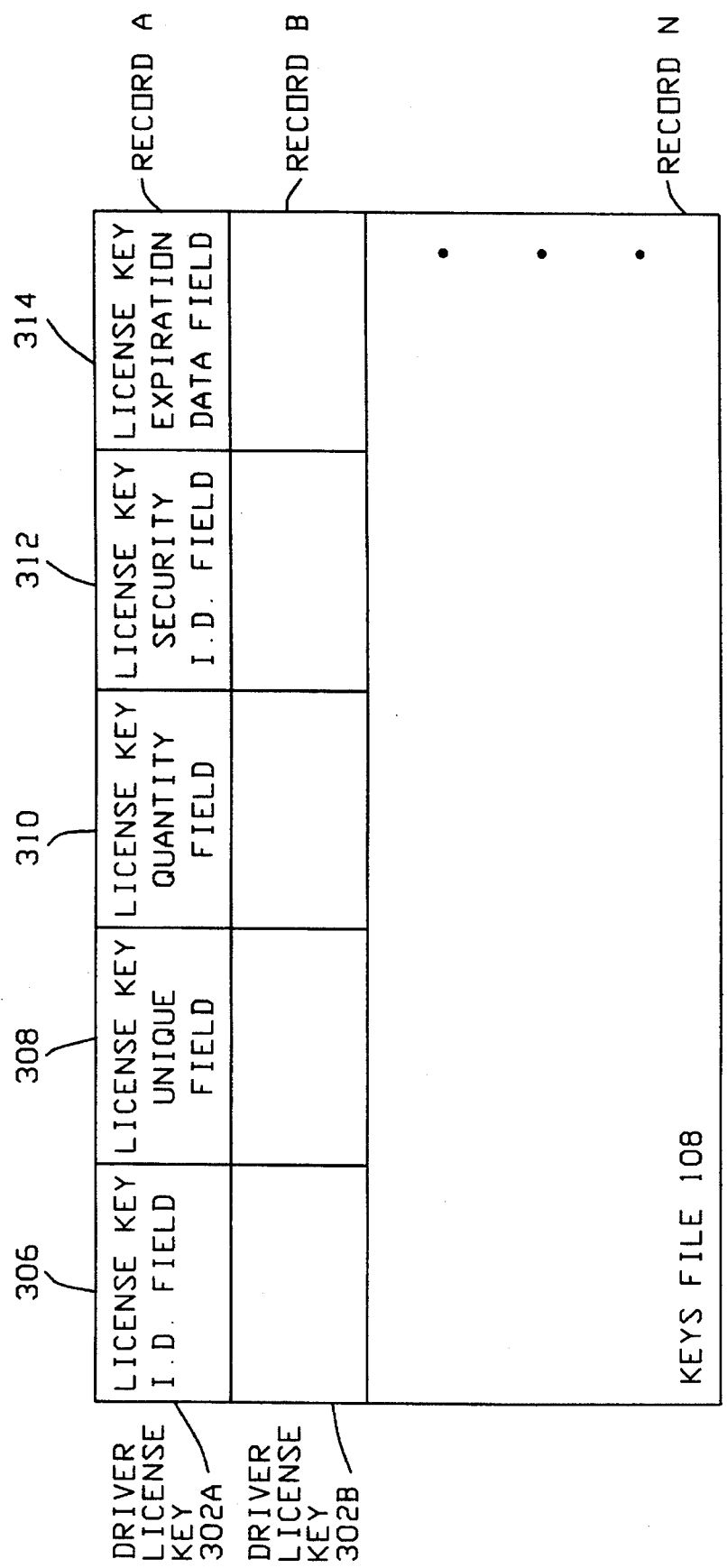
FIG. 3 is a diagram illustrating a keys file according to a preferred embodiment of the present invention.

As will be explained in more detail below, the keys file 108 contains records of driver license keys (302 in FIG. 3). When the host system 102 is initialized under the control of the operating system 106, the operating system 106 determines whether peripheral devices 110 have corresponding driver license keys 302 in the keys file 108 (a software driver license key is a string of EBCDIC characters representing a license to access one or more peripheral devices within a defined class or group of peripheral devices associated with that license). The operating system 106 performs this task by searching through the keys file 108 for any and all driver license keys 302 that correspond to the class of peripheral devices which includes the peripheral devices 110 in question.

B. Operation of the System

Figure 2:
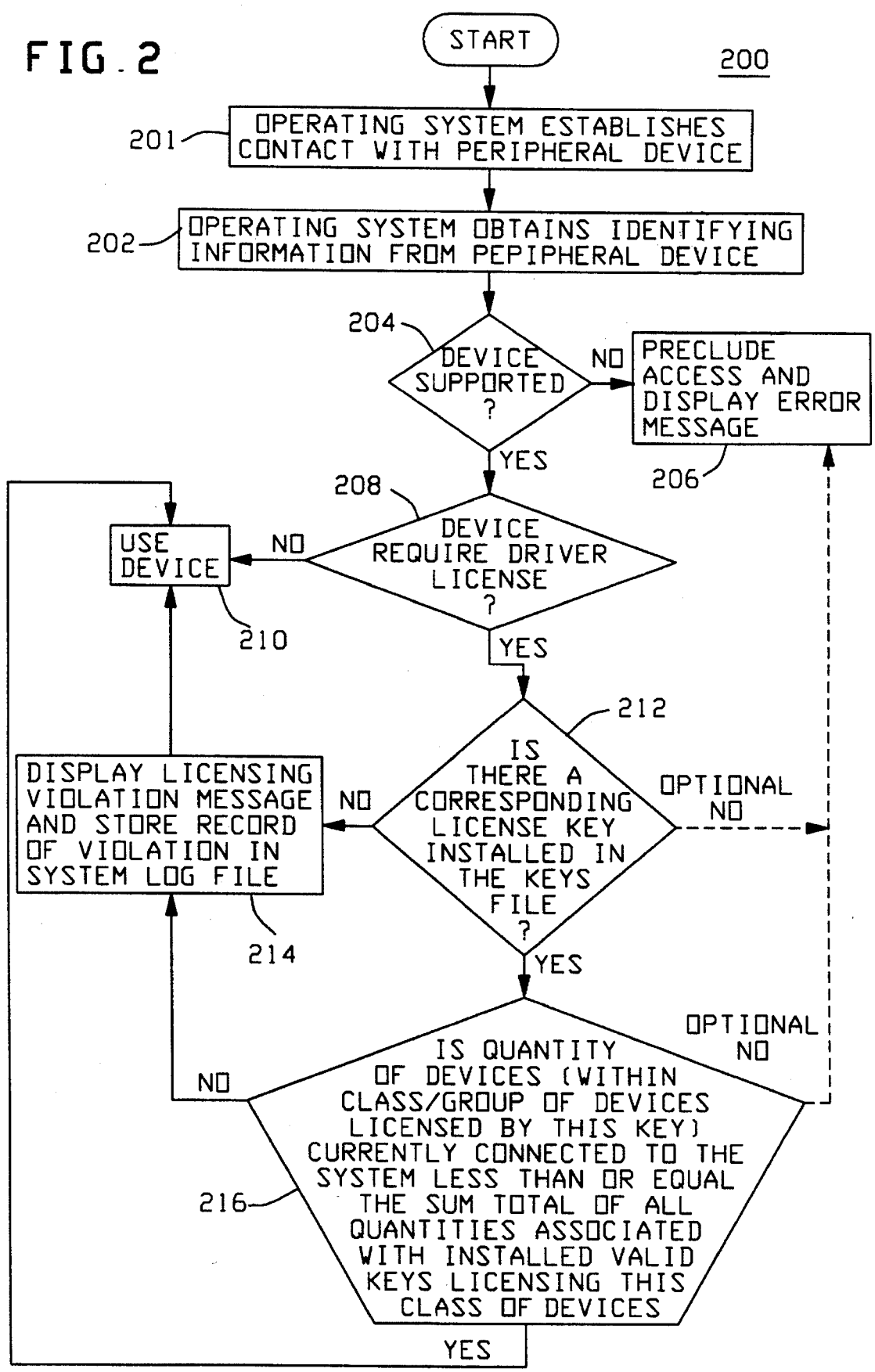
FIG. 2 is a flow chart illustrating the operation of an automated licensing process/system according to a preferred embodiment of the present invention.

FIG. 2 is a flow chart illustrating the operation of an automated licensing process/system 200 according to a preferred embodiment of the present invention. The operation of the system 200 will be described in more detail with reference to FIGS. 1 and 2.

Referring to FIG. 2, the licensing process 200 includes steps 201–216. Briefly, steps 201 and 202 represent the process of establishing contact with and obtaining identification information from the peripheral devices 110. Step 204 determines whether peripheral devices 110 are supported by the operating system 106. Steps 206–216 represent the process of checking the keys file 108 to confirm that any driver license keys 302 required for peripheral devices 110 are present. Additionally, steps 206–216 represent methods for encouraging a customer to purchase driver licenses (and thereby obtain the corresponding driver license keys 302 for installation in the keys file 108), for any peripheral devices 110 requiring, but not having, corresponding driver license keys 302 in the keys file 108. Steps 201–216 will now be described in more detail.

In step 201, the operating system 106, through the host system 102, establishes contact with peripheral devices 110. If peripheral device 110 has a functioning, physical connection to the I/O processor 116 (via bus 120/121), then the operating system 106 will be able to establish contact with peripheral device 110.

Next, in step 202, the operating system 106 obtains identification information for the peripheral device 110. In the preferred embodiment, step 202 makes use of a standard SCSI I/O protocol inquiry operation between the operating system 106 and the peripheral device 110. When an inquiry operation is issued to the peripheral device 110, inquiry data is returned to the operating system 106 containing peripheral device identification information. In the preferred embodiment, SCSI disk and tape devices are licensed (i.e., required to have a corresponding driver license key 302 installed in the keys file 108). However, the present invention could be extended to other peripheral devices 110, such as CD-ROM devices.

In decisional step 204, the operating system 106 examines the device identification information returned from step 202 and compares this data to a list (not shown, but located within the operating system 106) of peripheral devices supported by the operating system 106. If peripheral device 110 is not included in the aforementioned internal list, then the peripheral device 110 is not compatible with the operating system 106. In this situation, the operating system 106 displays an error message and access of the peripheral device 110 is precluded by the operating system 106, as shown in step 206.

If the peripheral device 110 is supported by the operating system 106, then in decisional step 208, the operating system 106 determines whether the peripheral device 110 requires a driver license key 302 (is licensed).

A driver license key 302 is a string of EBCDIC characters divided into relevant fields. The driver license key 302 is stored in the keys file 108. The keys file 108 is shown in more detail in FIGS. 3 and 4. FIG. 3 is conceptual diagram of the keys file 108 including driver license keys 302 (records A and B). FIG. 4 shows an example of the contents of an actual keys file 108. Referring to FIG. 3, in the preferred embodiment, the driver license key 302 includes five fields: a license key ID field 306, a license key uniqueness field 308, a license key quantity field 310, a license key security ID field 312, and an optional license key expiration date field 314. The license key ID field 306 contains license identification information that indicates the class of group of peripheral devices 110 licensed by the key 302 (e.g., SCSI disk devices attached to the system via a SCSI-2 channel). The license key uniqueness field 308 contains a string of characters which is unique for each key and is used to prohibit the manufacture of duplicate driver license keys 302. The license key quantity field 310 contains the quantity of peripheral devices 110 licensed by the key. The license key security ID field 312 contains a string of characters (not viewable by the customer) used to prohibit creation of unauthorized driver license keys 302. The optional license key expiration date field 314 contains an expiration date for the license key 302. After this date, the driver license key 302 will be ignored (considered invalid) by the operating system 106.

Thus, when a customer desires access of a peripheral device 110 of the type that requires a license, the customer must purchase a software driver license for that peripheral device 110. The corresponding software driver license key 302 is then installed in the keys files 108.

Referring back to FIG. 2, in decisional step 208, if the peripheral device 110 does not require a driver license (and therefore a driver license key 302), then the operating system 106 allows access of the peripheral device 110, as shown in step 210.

If the peripheral device 110 requires a driver license, then the process proceeds to decisional step 212, which determines whether the corresponding license key 302 is installed in the keys file 108. The operating system 106 searches the keys file 108 for a valid key having the license ID field 306 and security ID field 312 corresponding to the class or group of peripheral devices 110 which includes the peripheral device 110 in question.

If no valid, matching license key 302 is found, then in the preferred embodiment, the operating system 106 displays a licensing violation message instructing the user to obtain a driver license key 302 in order to access the peripheral device 110 which requires a license, shown in step 214. Additionally, in step 214, the operating system 106 stores a record of the violation in the log file 118. This provides the manufacturer of the operating system 106 or the host system 102 a method for periodically checking for licensing violations by scanning the contents of the log file 118 with a log analysis tool. The peripheral device 110 may still be accessed by the customer as shown in step 210.

If, in decisional step 212, a valid, matching driver license key 302 is located in the keys file 108, then the process proceeds to decisional step 216. In decisional step 216, the operating system 106 sums up the amounts in the quantity fields of all the valid installed keys which license the class or group of peripheral devices 110 which includes the peripheral device 110 in question. If this total is less than the total number of peripheral devices 110 belonging to this class of peripheral devices 110 currently accessed by the system, then the operating system 106 displays a licensing violation message and logs the violation in the log file 118 for later retrieval as described above with reference to step 214. If there is no violation, execution proceeds directly to step 210 and access of peripheral device 110 is permitted.

It is contemplated to preclude access of the peripheral device 110 if a peripheral device 110 is attempted to be accessed without a corresponding license key 302 in the keys file 108. Thus, instead of proceeding to step 214 from decisional steps 212 and 216, the "OPTIONAL NO" path can be chosen. In this case, the system would proceed to step 206, forcing the customer to obtain a license (and therefore a license key 302) before accessing the unlicensed peripheral device 110.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for discouraging or preventing an unlicensed peripheral device from being accessed by a computer system, having an operating system that has established contact with said peripheral device and has obtained identifying information associated with said peripheral device, wherein said peripheral device is of a type supported by said operating system, comprising the steps of:

(a) determining whether said peripheral device requires a peripheral software driver license in order to be accessed by the computer system;

(b) permitting access of said peripheral device by the computer system, if said peripheral device does not require a software driver license;

(c) determining whether a software driver license key is installed to said computer system, if said peripheral device requires a software driver license;

(d) compelling installation of said software driver license key, if said software driver license key is required and is not installed on said computer system (e) determining a quantity of peripheral devices permitted to be accessed by the computer system by said driver license key;

(f) determining if said quantity of peripheral devices permitted to be accessed by the computer system by said driver license key is exceeded if an additional peripheral device licensed by said driver license key is accessed by the computer system; and (g) compelling installation of an additional driver license key to cover additional peripheral devices, if the quantity associated with said driver license key is exceeded.

2. The method of claim 1, wherein said step of compelling installation of said driver license key comprises the step of displaying a licensing violation notification on a display device of said computer system.

3. The method of claim 2, further comprises the step of storing a record of said licensing violation in the computer system.

4. The method of claim 1, wherein said step of compelling installation of said driver license key comprises the step of denying said access of said peripheral devices by the computer system.

5. The method of claim 4, further comprises the step of storing a record of said licensing violation in the computer system.

6. An automated licensing system employed in a computer system to ensure that only peripheral devices with paid-up license fees can be accessed by said computer system comprising:

a host system, an operating system, comprising at least one embedded driver to permit communication between peripheral devices and the computer system; and a disk subsystem, coupled to said host system, comprising at least one driver license key containing identification information used to determine whether a particular peripheral device is licensed by said driver license key, wherein said operating system examines said dirver license key before permitting said host system access to said peripheral devices, wherein said driver license key comprises key uniqueness information, peripheral device quantity information, and optional key expiration information, wherein said key uniqueness information prohibits the manufacture of duplicate driver license keys, wherein said peripheral device quantity information indicates a quantity of peripheral devices licensed by said driver license key, and wherein said expiration information provides a means for invalidating a driver license key after a specified date.

* * * * *